United States Patent

[11] 3,595,527

| | | |
|---|---|---|
| [72] | Inventor | Burdette L. Douglass<br>Rockford, Ill. |
| [21] | Appl. No. | 841,304 |
| [22] | Filed | July 14, 1969 |
| [45] | Patented | July 27, 1971 |
| [73] | Assignee | Atwood Vacuum Machine Company<br>Rockford, Ill. |

[54] QUICKLY RETRACTABLE AND EXTENSIBLE JACK CONSTRUCTION
19 Claims, 3 Drawing Figs.

[52] U.S. Cl. .................................................. 254/86, 254/98
[51] Int. Cl. .................................................. B60s 9/08
[50] Field of Search .......................................... 248/407; 254/86, 98, 100, 133.1; 269/207, 208; 280/150.5, 512; 287/58 CT

[56] References Cited
UNITED STATES PATENTS

| 964,394 | 7/1910 | Coddington .................. | 248/407 X |
| 2,167,520 | 7/1939 | Claud-Mantle ............... | 254/86 X |
| 3,022,043 | 2/1962 | Weiss ........................... | 254/98 |

Primary Examiner—Robert C. Riordon
Assistant Examiner—Alan G. Goedde
Attorney—Andrew F. Wintercorn ABSTRACT: An elongated upright tubular support of square cross section is fastened to the trailer tongue between the trailer body and the outer end of the tongue where the usual socket for a ball and socket coupler is located. An elongated tubular jack body is supported in retracted position on top of said support and is slidable up and down in said support and has a series of radial projections therein which can be passed through a passageway in one corner portion of said support when extending the jack body downwardly to or retracting the same from operative position, these projections being adapted to be entered for a rough adjustment in L-shaped slots provided in said support and communicating by one leg of the L with said passageway. Then the jackscrew, operable from the upper end of said jack body adjusts the load carrying member that is slidable in the jack body to make the fine adjustment, seating one or two projections in the upper end of the slot or slots.

PATENTED JUL 27 1971  3,595,527
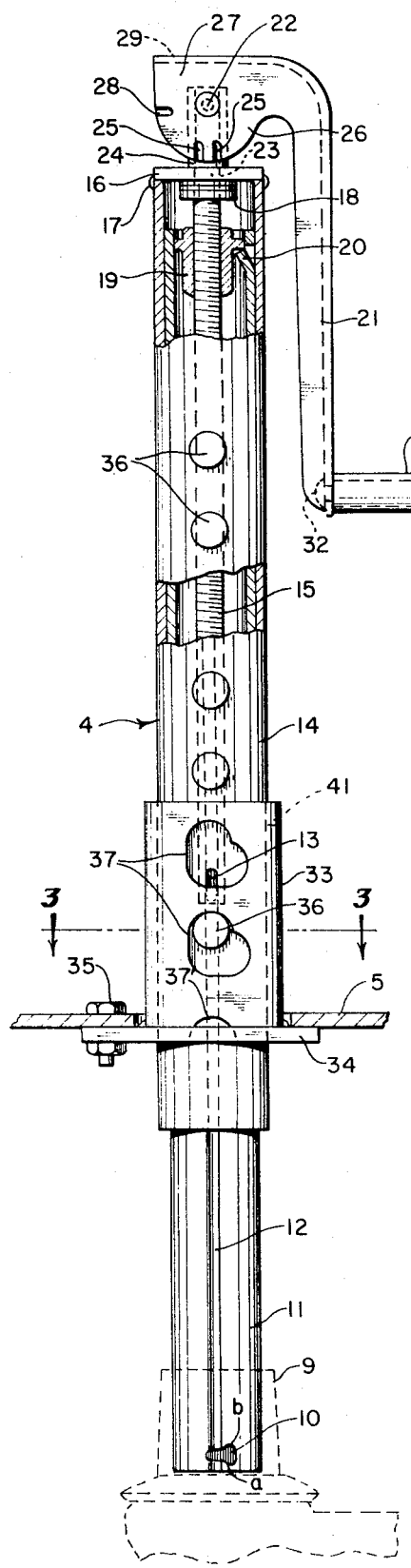
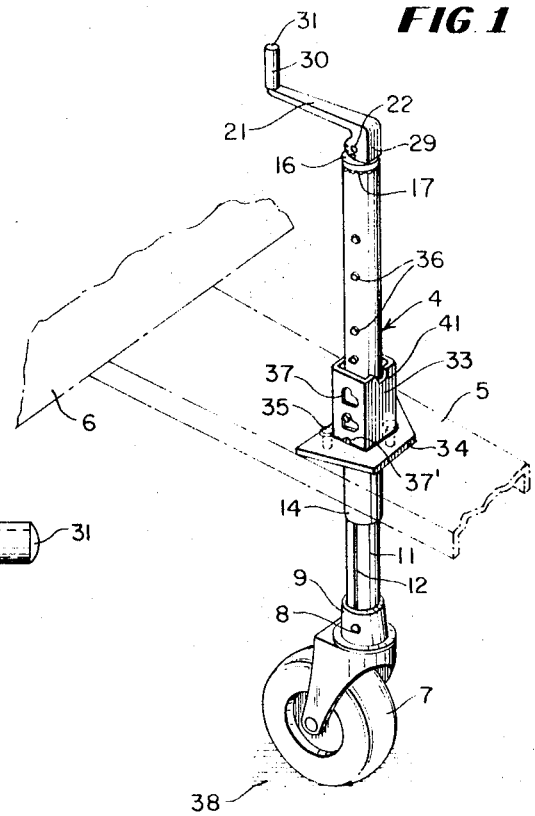
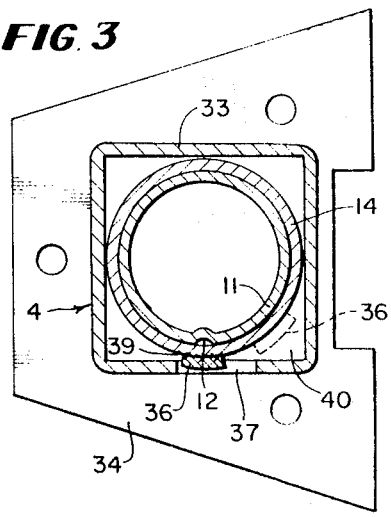
INVENTOR:
BURDETTE L. DOUGLASS
ATTORNEY

QUICKLY RETRACTABLE AND EXTENSIBLE JACK CONSTRUCTION

This invention relates to a quickly retractable and extensible jack construction for trailers.

A salient feature of the present invention is the provision of radial supporting projections at vertically spaced intervals on the cylindrical tubular body of the jack which can be passed freely longitudinally through the corner portions of the square tubular support on the tongue of the trailer to obtain a quick rough height adjustment by entry of one of these projections in whichever one of two vertically spaced generally L-shaped slots in the tubular support happens to register with the projection when, for example, the jack is being extended downwardly to rest on the ground, after which the jackscrew is operated for the fine adjustment until the load is assumed by the projection abutting the upper end of the vertical leg of the L-shaped slot, the horizontal leg of the slot serving only to provide operating clearance for entry and exit of the projection to and from the slot. In the retracted position, the lowermost one of the projections engages in a semicircular recess provided in the upper end of the square tubular support to retain the jack in this out-of-the-way position.

The invention is illustrated in the accompanying drawing, in which:

FIG. 1 is a perspective view of a jack assembly made in accordance with my invention, indicating in phantom a portion of the trailer tongue and also a portion of the trailer body, the jack being shown in extended position with the crank also in operative position for the finer screw adjustment of the jack, as when lifting the coupler socket (not shown) off the coupler ball (not shown) on the rear end of a towing vehicle;

FIG. 2 is a side view of the jack assembly on a larger scale, partly in side elevation and partly in longitudinal section to better illustrate the construction, and FIG. 3 is a horizontal section on a still larger scale, taken on the line 3-3 of FIG. 2.

The same reference numerals apply to corresponding parts in these three views.

Referring to the drawing, the jack assembly of my invention designated generally by the reference numeral 4 is shown mounted on the tongue 5 of a trailer between the body 6 and the socket of a ball and socket coupler (not shown), so that when the trailer reaches the spot where it is to be uncoupled from the towing vehicle, the jack 4 is adapted to be extended downwardly to assume the load. A caster wheel 7 may be detachably coupled to the jack by engagement of a radially inward projection 8 in the socket 9 in a two-way generally T-shaped bayonet slot 10 provided on the lower end of the jack's lift tube 11, entry of the projection 8 in the T-slot 10 being conveniently made through the lower end of a vertically extending groove 12 formed in the tube and cooperating with a radially inwardly projecting key portion 13 indented in the tubular body 14 of the jack to hold the tube 11 against turning relative to tube 14. The lift tube 11 telescopes in tube 14, as most clearly appears in FIGS. 2 and 3 and also illustrated in FIG. 1. The T-shape of slot 10 is important because when the jack is suspended from the tongue 5, the projection 8 will engage in the lower end *a* of the cross-portion of the T so as to be held against coming out of the slot 10 accidentally, and then when the caster wheel 7 rests on the ground, the projection 8 will engage in the upper end *b* of the cross-portion of the T to again prevent accidental disengagement of the projection 8 from the slot 10. The construction also enables easy removal of the caster wheel and substitution of a flat pad or block under tube 11 where a caster wheel is not suitable. A jackscrew 15 is centrally located axially with respect to tubes 11 and 14, as clearly shown in FIG. 2, and extends downwardly therein from the top plate 16, suitably welded as at 17 to the upper end of the tube 14 and has its upper end swiveled with respect to the plate 16 by means of a bearing 18 and threads in a nut 19 suitably supported in the upper end of tube 11 on an indented portion 20 and suitably held against turning with respect to the tube 11, whereby to force the lift tube 11, downwardly with respect to the tube 14 when the screw 15 is turned in a clockwise direction. The screw is turnable by means of a crank 21 of channel section sheet metal construction which is pivotally connected, as at 22, with the slightly reduced upper end portion of the screw which extends through a center hole 23 in plate 16 and has a sleeve 24 telescoped thereon and having bearing contact at its lower end on top of the plate 16 holding the screw 15 against downward displacement with respect thereto. The spaced parallel indented portions 25 on the one segmental-shaped sidewall 26 of the channel-shaped pivoted end 27 of the crank 21 serves by abutment with the sleeve 24 to hold the crank in the folded position shown in FIG. 2, whereas the other indented portion 28 serves by cooperation with the outer wall 29 of the channel to hold the crank releasably in the unfolded operative position shown in FIG. 1. The sidewall 26 is resilient enough to allow spreading of the channel to the small extent necessary for the switching of the crank from one position to the other and to hold the crank firmly enough in each of its two positions by means of the projections mentioned. The handle 30 turns freely on a headed pin 31 which has a reduced end portion entered through a hole in the outer end of the crank 21 and upset as seen at 32.

The jack assembly 4 includes an elongated square upright tubular support 33 having a bottom flange 34 welded thereon by means of which the same is adapted to be bolted to the tongue 5 of the trailer, as indicated at 35 in FIGS. 1 and 2. Radial projections 36 are provided in vertically spaced longitudinally aligned relationship along one side of the tubular body 14 for engagement of the lowermost one of these projections selectively in either of the two generally L-shaped slots 37 provided in vertically spaced relationship in one sidewall of the tubular support 33, the lowermost projection 36 being shown in FIGS. 1 and 2 as engaged in the lower L-shaped slot abutting the upper end of the vertical leg thereof to assume the load of the trailer when the caster wheel 7 (or other base) of the jack is resting on a supporting surface, indicated at 38 in FIG. 1. The rest of the projections 36 are in pairs spaced similarly as the slots 37 and all of them are defined by stamped circular sheet-metal pads curved to fit the cylindrical surface of the tubular body 14 and welded thereto, as shown at 39 in FIG. 3. A third notch or slot 37' in the bottom of the support 33 is adopted to be used similarly as slots 37 to increase the range of adjustability. The generally triangular space or passageway 40 in the corner of the square tubular support 33 extending lengthwise thereof affords ample clearance space through which to move the projecting pads 36 lineally into position for entry into whichever one (or both) of the two L-shaped slots 37 is registered with the pad (or pads), whereupon the tubular body 14 is turned in a clockwise direction to enter the pad (or pads) through the horizontal leg of the L-shaped slot (or slots) into operative relationship to the vertical leg (or legs) thereof, after which it is an easy matter by means of the crank 21 to make the fine adjustment necessary to bring the pad (or pads) 36 into engagement with the upper end (or ends) of the vertical leg (or legs) of the slot (or slots), appears in FIG. 1 and 2, so that the jack assembly 4 assumes the load of the trailer. The screw 15 is turned far enough to raise the tongue 5 to get the socket of the ball and socket coupler (not shown) raised clear of the ball-head so that the towing vehicle can be driven away leaving the trailer in a parked position. Whatever further adjustment of the screw 15 is necessary thereafter to get the body 6 of the trailer into a substantially horizontal plane, can be made thereafter. The third notch or slot 37' is so spaced relative to slots 37 that two pads 36 may engage in slots for joint support, giving a safety feature in that if one pad happens to be poorly welded, the other will still support the load.

In operation, the jack assembly 4 is supported in a raised retracted position by engagement of the lowermost one of the pad projections 36 in a half-round notch 41 provided in the upper end of the square tubular support 33, and, unless the socket 9 of the cast-wheel 7 is permanently secured to the lower end of the tube 11, as by bolting or welding the same thereto, it can be removed during transportation of the trailer. The crank 21 at such times is usually left in the folded position shown in FIG. 2. Upon arrival at the desired location for the trailer, the tubular body 14 is raised to disengage the lowermost pad projection 36 from the notch 41 and then turned through about 45° so as to align the pads 36 with passageway 40 and enable dropping the jack to extended position where the wheel 7 (or other base) rests on the ground or other supporting surface 38, after which whichever one (or two) of the pad projections 36 is in register with one or the other (or both) of the L-shaped slots 37 is engaged in that slot (or slots) by turning the tubular body 14 through another 45° in a clockwise direction, moving the projection (or projections) from the dotted line position shown in FIG. 3 to the full line position, after which the crank 21 can be swung to operative position and turned to make the fine adjustment with the jackscrew 15 to engage the pad projection (or projections) 36 in the upper end of the L-shaped slot (or slots) 37 and raise the tongue 5 enough to get the socket of the ball and socket coupler raised off the ball-head and allow the towing vehicle to be driven away. Notch or slot 37' is used alone or in combination with one of the slots 37 to provide further one pad or two pad supports, thus increasing the range of adjustability. Whatever further fine adjustment is necessary after a pad or pads 36 are engaged in the slots can be made with the jackscrew 15 and finally the crank 21 can be folded again to reduce likelihood of someone tampering with the screw adjustment. The return of the trailer to coupled relationship to the towing vehicle involves the same simple procedure but in the reverse order.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In a jack assembly of the character described comprising an upright elongated tubular support, a tubular elongated jack body guided in said tubular support for movement from a raised retracted position to a lowered extended operative position, an elongated tubular load carrier body, telescoping in said tubular jack body, and a jackscrew and nut means for adjusting said tubular load carrier body longitudinally relative to said tubular jack body, the improvement which consists in said tubular jack body having a radial projection thereon movable lineally in a passageway provided inside said tubular support longitudinally thereof, said tubular support having a slot provided therein opening from one side of said passageway into which said projection is adapted to be entered by lateral movement in one direction when located in said passageway in the plane of said slot for interconnection of said tubular body with said tubular support for load carrying purposes, said projection being movable laterally in the opposite direction for disconnection of said tubular body from said tubular support.

2. A jack assembly as set forth in claim 1 wherein the radial projection is one of a plurality of such projections provided in vertically spaced relation on said tubular jack body, these projections being movable lineally through the passageway provided inside said tubular support, whereby to register a selected one of said projections with said slot and enter the same therein for load carrying purposes.

3. A jack assembly as set forth in claim 2 wherein there is more than one slot provided in said tubular support opening from the passageway, these slots being spaced above one another in a predetermined spaced relation relative to the spacing of said projections, whereby to permit entry of a selected projection into a selected slot for load carrying purposes at a selected elevation.

4. A jack assembly as set forth in claim 2 wherein there is more than one slot provided in said tubular support opening from the passageway, these slots being spaced above one another in a predetermined spaced relation relative to the spacing of said projections, whereby to permit entry of a selected projection into a selected slot for load carrying purposes at a selected elevation, the projections being all in longitudinally aligned relation with respect to said tubular jack body, and said slots opening off one side of said passageway.

5. A jack assembly as set forth in claim 2 wherein there is more than one slot provided in said tubular support opening from the passageway, these slots being spaced above one another in a predetermined spaced relation relative to the spacing of said projections, whereby to permit entry of a selected projection into a selected slot for load carrying purposes at a selected elevation, the projections being in aligned relation and in spaced pairs, and there being a pair of slots opening from one side of said passageway and spaced similarly as said projections.

6. A jack assembly as set forth in claim 1, wherein the tubular jack body is of circular form in cross section and the upright tubular support is of square form in cross section, the sides of the square being tangent to the circle defined by said jack body, leaving a generally triangular space in the corners of the square longitudinally of said support to provide in one of these corners the passageway lengthwise of said support.

7. A jack assembly as set forth in claim 1, wherein the slot is generally L-shaped, the one leg of the L opening laterally into the passageway for entry of the projection into the slot, the other leg of the L extending upwardly substantially at right angles to the first leg and adapted to have said projection engage the upper end thereof remote from the first leg for load carrying purposes.

8. A jack assembly as set forth in claim 1, wherein said tubular body support has a notch provided in the upper end thereof adapted to receive said radial projection in the raised retracted position of said tubular jack body.

9. A jack assembly as set forth in claim 2, wherein said tubular support has a notch provided in the upper end thereof adapted to receive the lowermost one of said radial projections in the raised retracted position of said tubular jack body.

10. A jack assembly as set forth in claim 1, wherein said radial projection comprises a sheet metal pad secured to the outside of said tubular jack body.

11. In a jack comprising a support, a tubular body thereon having a radially inward key projection, an elongated load carrier member telescoping in said tubular body and having a groove provided thereon longitudinally thereof in which said key projection is slidably received to hold said load carrier member against turning, and jackscrew and nut means for adjusting said load carrier member longitudinally relative to said tubular body and support by rotation of said screw relative to said nut, the improvement which consists in said groove extending to the lower end of said load carrier member, and a load supporting base member that is detachably assembled on the lower end of said load carrier member and having a socket receiving the lower end of said load carrier member, said base member being detachably connectable thereto by means of a T-slot provided in the lower end portion of said load carrier with the leg of the T extending transversely of and communicating with said groove, and a projection in said socket radially inwardly thereof enterable in said T-slot through the lower end of said groove and arranged to engage in the lower end of the cross-portion of the T-slot while said base is suspended on said load carrier member to prevent accidental disengagement from said T-slot, said projection engaging in the upper end of the cross-portion of the T-slot when the base member assumes the load imposed on the load carrier member to again prevent accidental disengagement from said T-slot.

12. In a jack comprising a support, a tubular jack body carried thereon in which an elongated tubular load carrier is slidable endwise by means of a jackscrew extending axially with respect to said telescoped jack body and load carrier and threading in a nut in said load carrier to move the same endwise in either direction, said screw having one end extending from the adjacent end of said jack body for rotation, the improvement comprising a crank of L-shaped construction having a short leg and a long leg, the short leg of the L being pivotally connected with the outer end of said screw on a transverse axis, whereby the long leg of the L is movable from a retracted position substantially parallel to said screw and jack body to an operative position at right angles to said screw and jack body, and a handle on the outer end of the long leg of the L, said crank being of channel construction in the pivoted end portion and providing substantially parallel segmental shaped sidewalls struck on a radius with the pivotal axis as a center and a connecting transverse wall on the other side of said pivotal axis, at least one of said sidewalls having two laterally spaced rounded inward detent projections on opposite sides of the midpoint of the arcuate edge portion arranged for engagement on opposite sides of the projecting end portion of said jackscrew for holding said crank releasably in retracted position, and another rounded inward detent projection at one end of the arcuate edge portion and so spaced relative to the one end of said connecting wall to serve by engagement of the end portion of said jackscrew between said projection and wall to hold said crank releasably in its operative position, the sidewalls of said channel being resilient and the wall having the detent projections thereon being adapted to be sprung outwardly relative to said screw sufficiently to permit movement of said crank from one position to another rand to hold the crank resiliently in either position.

13. A jack assembly of the character described comprising an upright elongated tubular support, a tubular elongated jack body guided in said tubular support for movement from a raised retracted position to a lowered extended operative position, an elongated tubular load carrier body, telescoping in said tubular jack body and a jackscrew and nut means for adjusting said tubular load carrier body longitudinally relative to said tubular jack body, the improvement which consists in said tubular jack body having a radial projection thereon movable lineally in a passageway provided inside said tubular support longitudinally thereof, said tubular support having a notch provided in its upper end to receive said projection in the raised retracted position of said jack body and another notch provided in its lower end to receive said projection in the lowered operative position for interconnection of said tubular body with said tubular support for load carrying purposes.

14. A jack assembly as set forth in claim 13, wherein the radial projection is one of a plurality of such projections provided in vertically spaced relation on said tubular jack body, these projections being movable lineally through the passageway provided inside said tubular support, whereby to register a selected one of said projections with said lower notch and enter the same therein for load carrying purposes, the lowermost one of said projections engaging in the upper notch in the retracted position of said jack body.

15. A jack assembly as set forth in claim 13 wherein said tubular support has a slot provided therein opening from one side of said passageway into which said projection is adapted to be entered for interconnection of said tubular jack body with said tubular support for load carrying purposes.

16. A jack assembly as set forth in claim 15 wherein the radial projection is one of a plurality of such projections provided in vertically spaced relation on said tubular jack body, these projections being movable lineally through the passageway provided inside said tubular support, whereby to register a selected one of said projections with said slot or lower notch and enter the same therein for load carrying purposes.

17. A jack assembly as set forth in claim 15 wherein the radial projection is one of a plurality of such projections provided in vertically spaced relation on said tubular jack body, these projections being movable lineally through the passageway provided inside said tubular support, whereby to enter a selected one of said projections in said slot or lower notch or two of said projections in said slot and lower notch for load carrying purposes.

18. A jack assembly as set forth in claim 14 wherein there is more than one slot provided in said tubular support opening from the passageway, these slots being spaced above one another in a predetermined spaced relation relative to the spacing of said projections, whereby to permit entry of a selected projection into a selected slot or lower notch for load carrying purposes, the projections being all in vertically aligned relation with respect to said tubular jack body, and said slots opening off the same side of said passageway.

19. A jack assembly as set forth in claim 14 wherein there is more than one slot provided in said tubular support opening from the passageway, these slots being spaced above one another and relative to the lower notch in a predetermined spaced relation relative to the spacing of said projections, whereby to permit entry of a selected projection or projections into a selected slot or slots or in a slot and lower notch for load carrying purposes, the projections being all in vertically aligned relation with respect to said tubular jack body, and said slots opening off the same side of said passageway.